(12) United States Patent
Lin et al.

(10) Patent No.: US 8,742,835 B2
(45) Date of Patent: Jun. 3, 2014

(54) SWITCH CIRCUIT AND CHARGE PUMP USING THE SAME THEREOF

(71) Applicant: Alpha Imaging Technology Corp., Hsinchu County (TW)

(72) Inventors: Lai-Ching Lin, Zhubei (TW); Chun-Chao Tung, Changhua (TW); Ya-Chi Chen, New Taipei (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 0 days.

(21) Appl. No.: 13/845,082

(22) Filed: Mar. 17, 2013

(65) Prior Publication Data
US 2014/0022006 A1   Jan. 23, 2014

(30) Foreign Application Priority Data

Jul. 19, 2012 (TW) .............................. 101126073 A

(51) Int. Cl.
*G05F 1/10* (2006.01)

(52) U.S. Cl.
USPC .......................................................... 327/536

(58) Field of Classification Search
CPC ................................. G05F 3/205; H02M 3/07
USPC .......................................................... 327/536
See application file for complete search history.

(56) References Cited

U.S. PATENT DOCUMENTS

| 4,812,961 | A | * | 3/1989 | Essaff et al. ..................... 363/61 |
| 4,897,774 | A | * | 1/1990 | Bingham et al. ................. 363/61 |
| 4,999,761 | A | * | 3/1991 | Bingham et al. ................. 363/60 |
| 5,262,934 | A | * | 11/1993 | Price ............................... 363/60 |
| 5,306,954 | A | * | 4/1994 | Chan et al. ..................... 307/110 |
| 5,668,710 | A | * | 9/1997 | Caliboso et al. ................ 363/60 |
| 7,598,797 | B2 | * | 10/2009 | Tseng et al. .................. 327/536 |
| 7,626,455 | B2 | | 12/2009 | Ito et al. |
| 7,990,742 | B2 | | 8/2011 | Lesso |

* cited by examiner

*Primary Examiner* — Jeffrey Zweizig
(74) *Attorney, Agent, or Firm* — Rabin & Berdo, P.C.

(57) ABSTRACT

The switch circuit comprises a first switch, a second switch, a third switch, a forth switch, a fifth switch, a sixth switch and a seventh switch. The first switch couples the voltage input terminal to one terminal of a flying capacitor. The second switch couples one terminal of the flying capacitor to one terminal of the output capacitor. The third switch couples one terminal of the flying capacitor to a common terminal. The fourth switch couples the other terminal of the flying capacitor to one terminal of the output capacitor. The fifth switch couples one terminal of the output capacitor to a positive voltage output terminal. The sixth switch couples the other terminal of the flying capacitor to the common terminal. The seventh switch couples the other terminal of the flying capacitor to a negative voltage output terminal.

20 Claims, 7 Drawing Sheets

SWITCH CIRCUIT AND CHARGE PUMP USING THE SAME THEREOF

This application claims the benefit of Taiwan application Serial No. 101126073, filed Jul. 19, 2012, the subject matter of which is incorporated herein by reference.

BACKGROUND OF THE INVENTION

1. Field of the Invention

The invention relates in general to a switch circuit and a charge pump using the same.

2. Description of the Related Art

Along with the advance in science and technology, the technology used in the manufacturing process also advances. The power design is directed towards low voltage and small size. In terms of power management, the charge pump is one of the most commonly used technologies. The charge pump storages and converts charges through a capacitor in conjunction with switch switching.

With regard to the inductive linear regulator system, the charge pump has lower electromagnetic interference (EMI) and can be used in low voltage and low cost design. With regard to the low power design, the charge pump has a small size and can be used for manufacturing an integrated circuit (IC).

SUMMARY OF THE INVENTION

The invention is directed to a switch circuit and a charge pump using the same.

According to an embodiment of the present invention, a switch circuit is disclosed. The switch circuit comprises a first switch, a second switch, a third switch, a forth switch, a fifth switch, a sixth switch and a seventh switch. The first switch couples the voltage input terminal to one terminal of a flying capacitor. The second switch couples one terminal of the flying capacitor to one terminal of the output capacitor. The third switch couples one terminal of the flying capacitor to a common terminal. The fourth switch couples the other terminal of the flying capacitor to one terminal of the output capacitor. The fifth switch couples one terminal of the output capacitor to a positive voltage output terminal. The sixth switch couples the other terminal of the flying capacitor to the common terminal. The seventh switch couples the other terminal of the flying capacitor to a negative voltage output terminal.

According to another embodiment of the present invention, a charge pump is disclosed. The charge pump comprises a voltage input terminal, a common terminal, a positive voltage output terminal, a negative voltage output terminal and a switch circuit. The switch circuit comprises a first switch, a second switch, a third switch, a forth switch, a fifth switch, a sixth switch and a seventh switch. The first switch couples the voltage input terminal to one terminal of a flying capacitor, and the second switch couples one terminal of the flying capacitor to one terminal of the output capacitor. The third switch couples one terminal of the flying capacitor to a common terminal, and the fourth switch couples the other terminal of the flying capacitor to one terminal of the output capacitor. The fifth switch couples one terminal of the output capacitor to the positive voltage output terminal, and the sixth switch couples the other terminal of the flying capacitor to the common terminal. The seventh switch couples the other terminal of the flying capacitor to the negative voltage output terminal.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
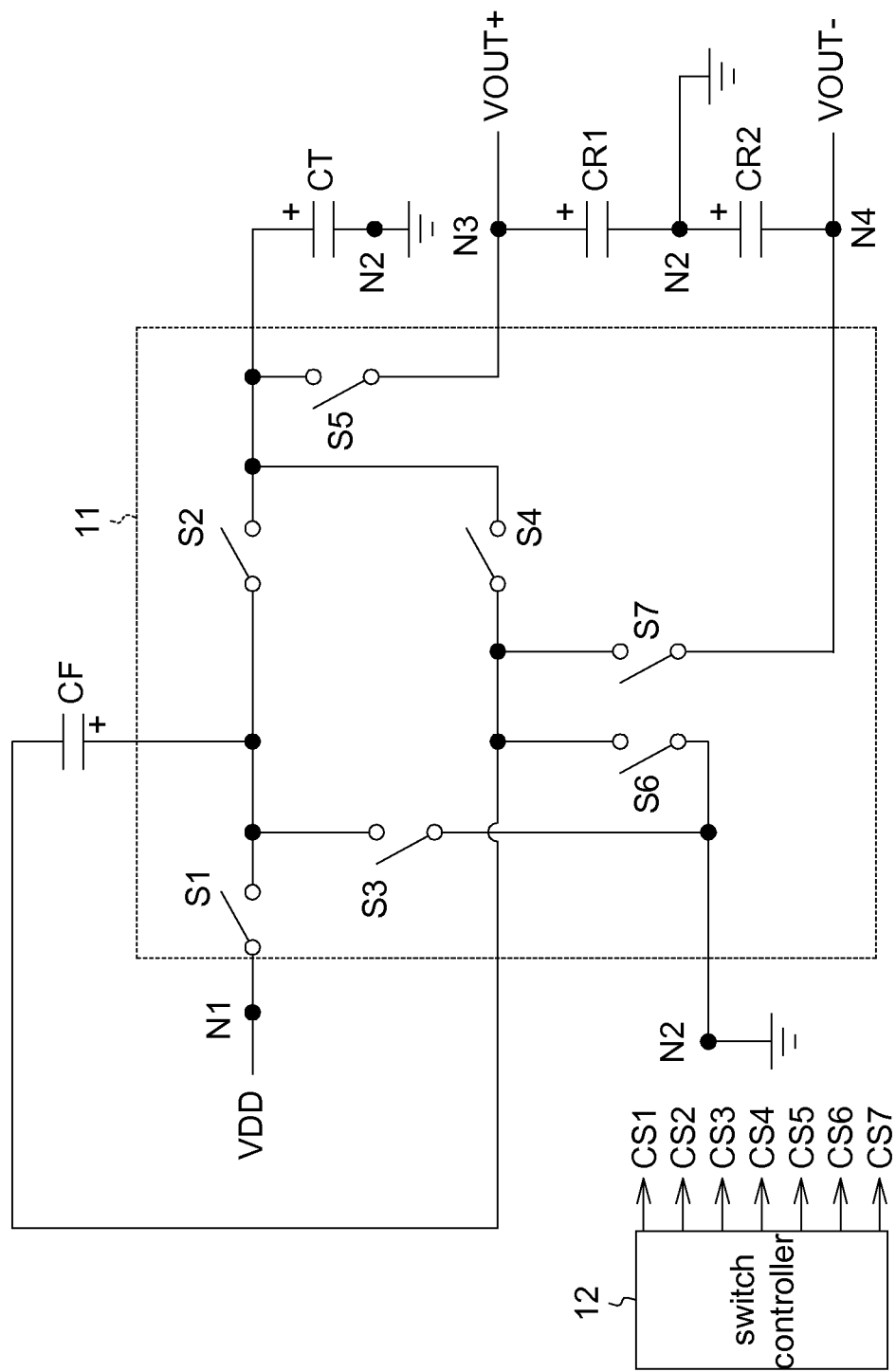
FIG. 1 shows a circuit diagram of a charge pump according to an embodiment.

Referring to Table 1 and FIG. 1 at the same time. FIG. 1 shows a circuit diagram of a charge pump according to an embodiment. The charge pump 1 comprises a switch circuit 11, a switch controller 12, a voltage input terminal N1, a common terminal N2, a positive voltage output terminal N3 and a negative voltage output terminal N4. The voltage input terminal N1 receives an input voltage VDD. The common terminal N2 is such as a ground terminal. The positive voltage output terminal N3 outputs a voltage VOUT+ to the loading. The negative voltage output terminal N4 outputs a voltage VOUT− to the loading.

The switch circuit 11, realized by such as an integrated circuit (IC), comprises switches S1, S2, S3, S4, S5, S6 and S7. The s switches S1, S2, S3, S4, S5, S6 and S7 are respectively controlled by the control signals CS1-CS7 generated by the switch controller 12 to sequentially and repetitively enter the charge stage, the equalize stage and the pump stage.

TABLE 1

|  | Charge Stage | Equalize Stage | Pump Stage |
| --- | --- | --- | --- |
| Switch S1 | ON | OFF | OFF |
| Switch S2 | OFF | ON | OFF |
| Switch S3 | OFF | OFF | ON |
| Switch S4 | ON | OFF | OFF |
| Switch S5 | OFF | OFF | ON |
| Switch S6 | OFF | ON | OFF |
| Switch S7 | OFF | OFF | ON |

The switch S1 couples the voltage input terminal N1 to one terminal of the flying capacitor CF. The switch S2 couples one terminal of the flying capacitor to an output capacitor CT. The other terminal of the output capacitor CT is coupled to the common terminal N2. The switch S3 couples one terminal of a flying capacitor CF to the common terminal N2. The switch S4 couples the other terminal of the flying capacitor CF to one terminal of the output capacitor CT. The switch S5 couples one terminal of the output capacitor CT to the positive voltage output terminal N3. The switch S6 couples the other terminal of the flying capacitor CF to the common terminal N4. The switch S7 couples the other terminal of the flying capacitor CF to the negative voltage output terminal N4. One terminal of an energy storage capacitor CR1 is coupled to the positive voltage output terminal N3, and the other terminal of the energy storage capacitor CR1 is coupled to the common terminal N2. One terminal of an energy storage capacitor CR2 is coupled to the negative voltage output terminal N4. The other terminal of the energy storage capacitor CR2 is coupled to the common terminal N2.

Figure 2:
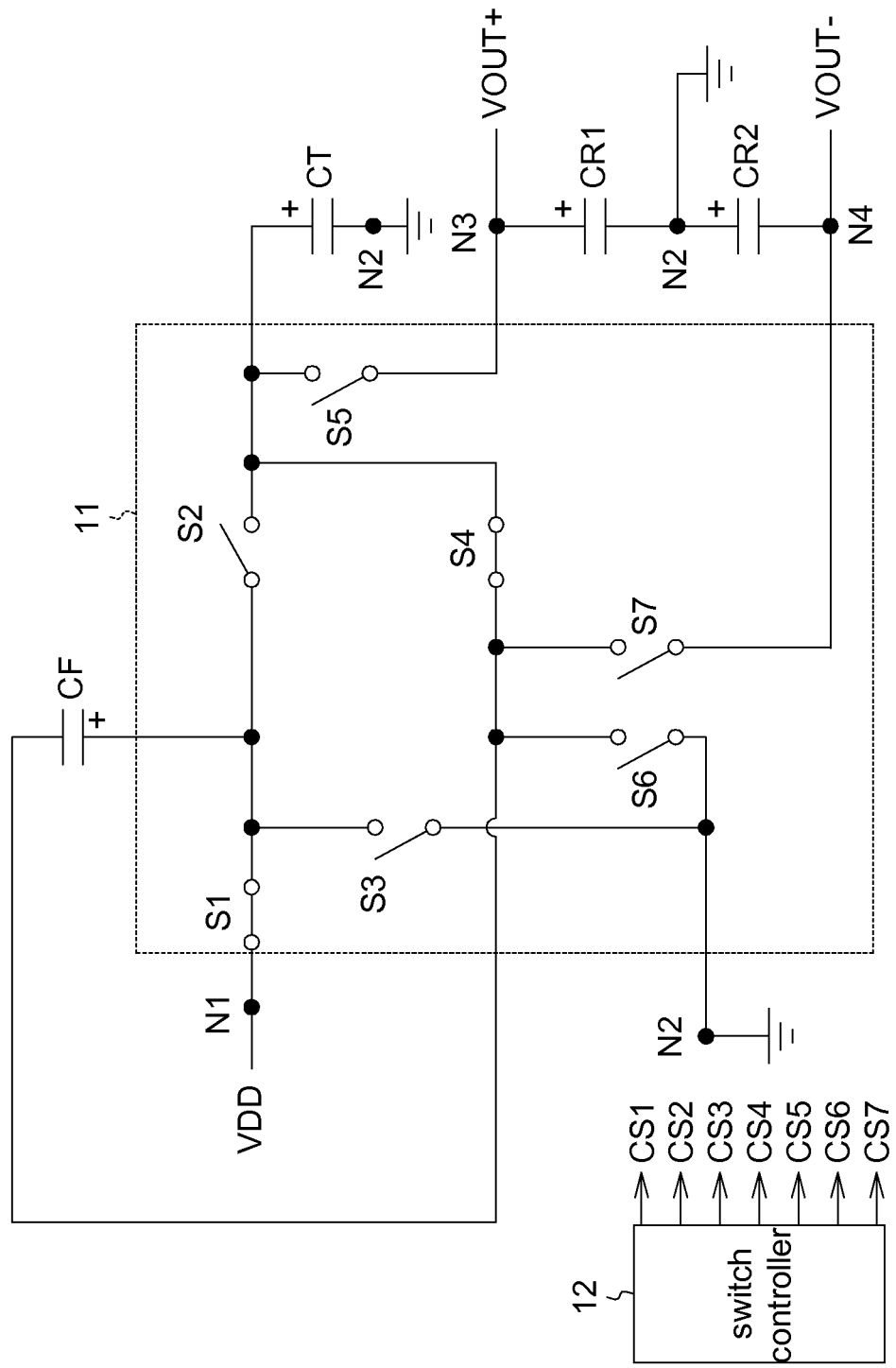
FIG. 2 shows a schematic diagram of a charge pump in a charge stage.
Figure 3:
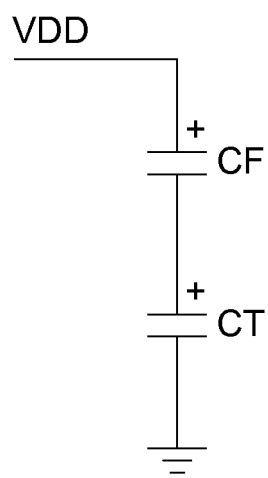
FIG. 3 shows an equivalent circuit diagram of the switch circuit of FIG. 2.

Referring to Table 1, FIG. 2 and FIG. 3 at the same time. FIG. 2 shows a schematic diagram of a charge pump in a charge stage. FIG. 3 shows an equivalent circuit diagram of the switch circuit of FIG. 2. The switches S1 and S4 are turned on in a charge stage, and the switches S2, S3, S5, S6 and S7 are turned off in the charge stage. The flying capacitor CF and the output capacitor CT are connected in series. The input voltage VDD charges the flying capacitor CF and the output capacitor CT.

Figure 4:
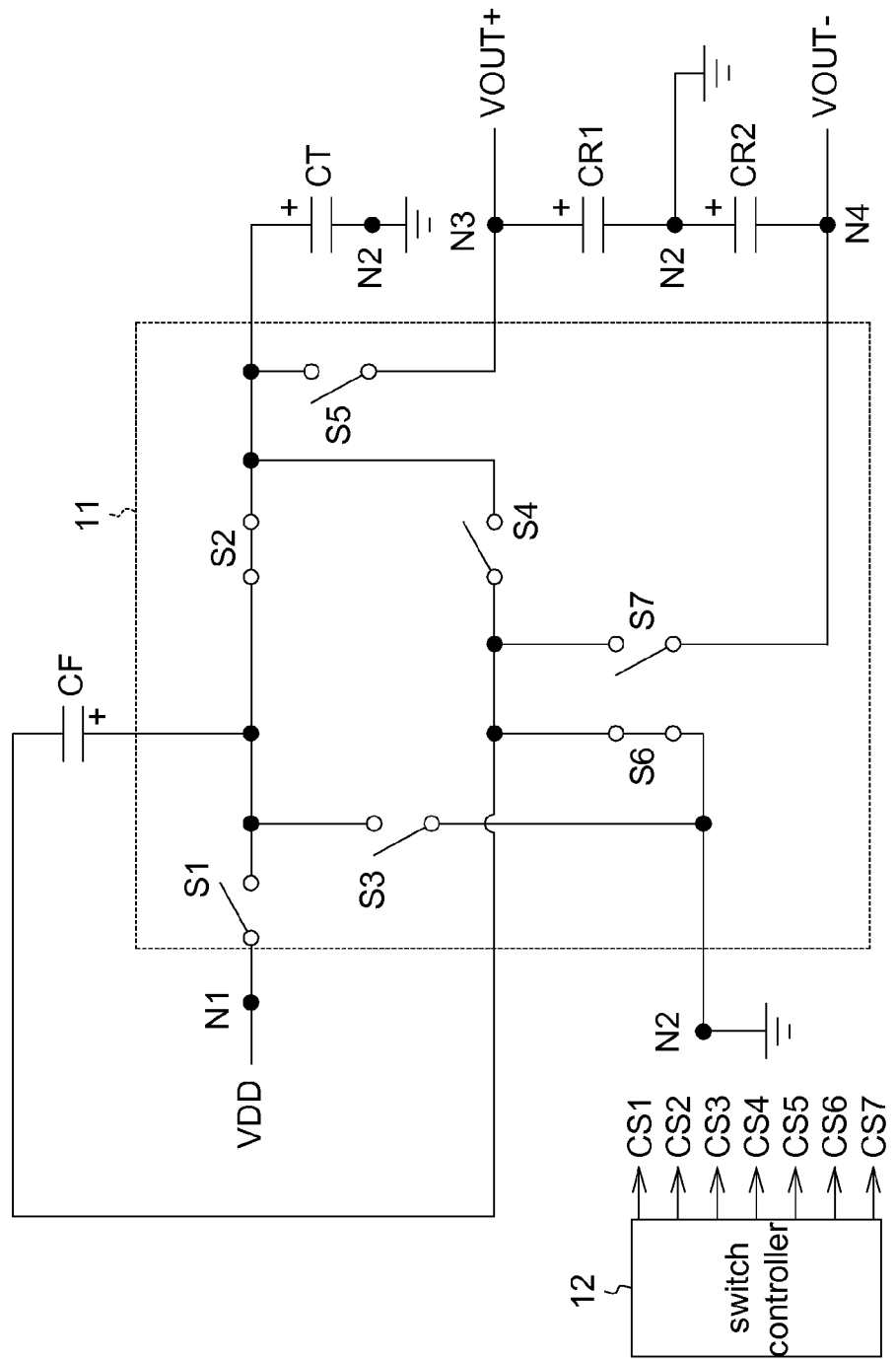
FIG. 4 shows a schematic diagram of a charge pump in an equalize stage.
Figure 5:
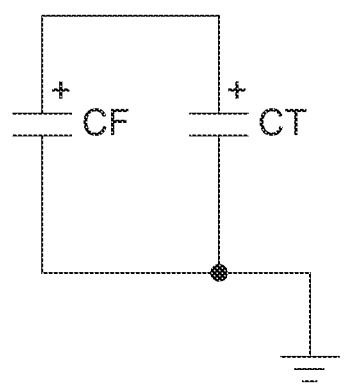
FIG. 5 shows an equivalent circuit diagram of the switch circuit of FIG. 4.

Referring to Table 1, FIG. 4 and FIG. 5 at the same time. FIG. 4 shows a schematic diagram of a charge pump in an equalize stage. FIG. 5 shows an equivalent circuit diagram of the switch circuit of FIG. 4. The switches S2 and S6 are turned on in an equalize stage, and the switches S1, S3, S4, S5 and S7 in are turned off in the equalize stage. The flying capacitor CF and the output capacitor CT are connected in parallel, such that the cross-voltage of the flying capacitor CF is equal to that of the output capacitor CT.

Figure 6:
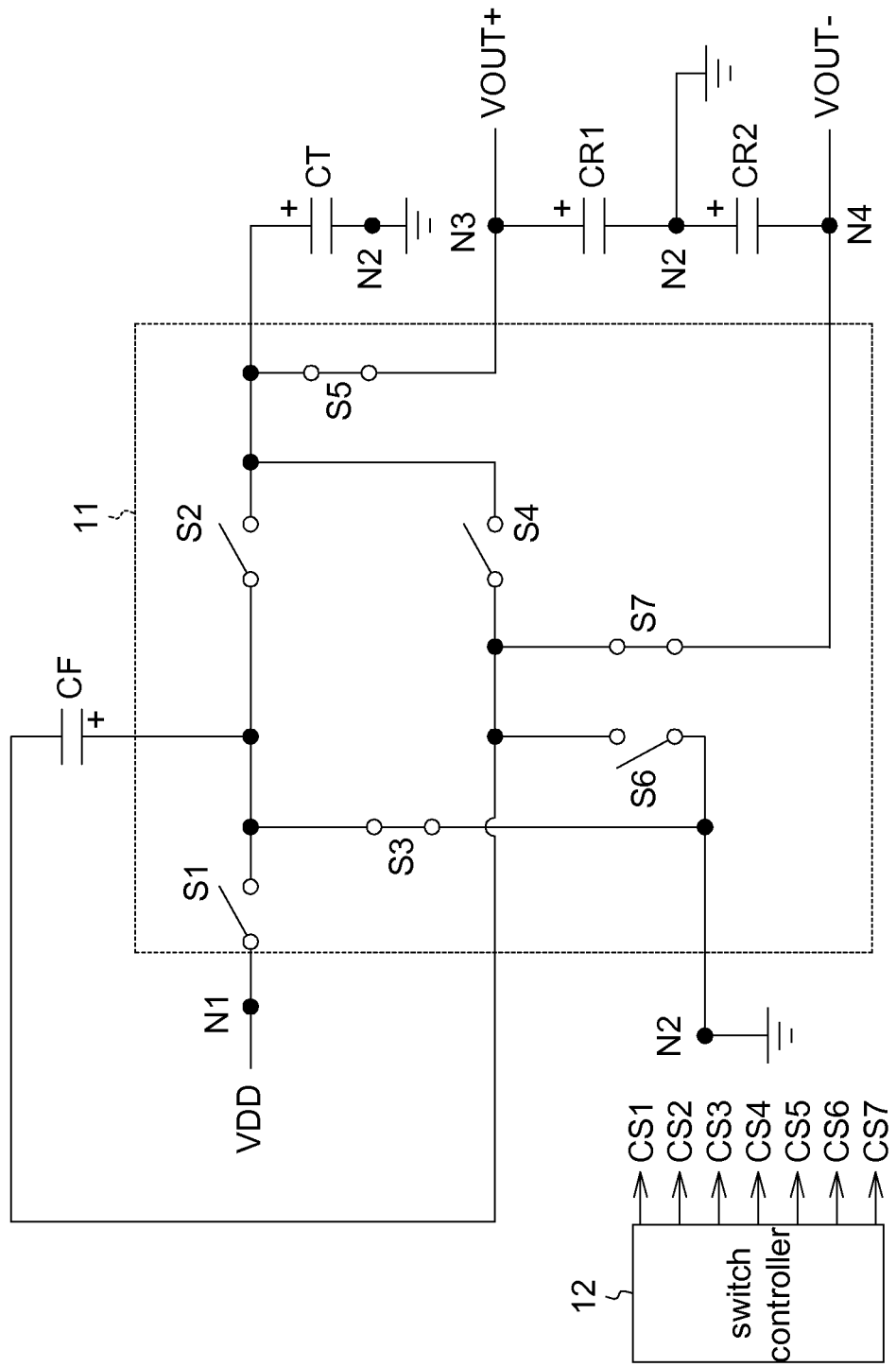
FIG. 6 shows a schematic diagram of a charge pump in an equalize stage.
Figure 7:
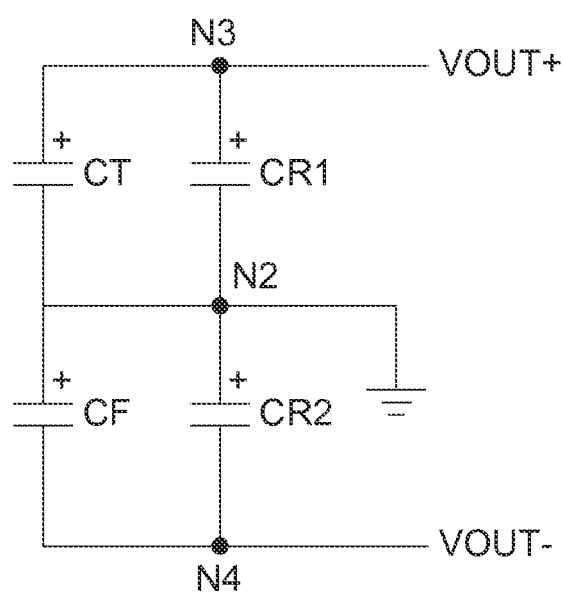
FIG. 7 shows an equivalent circuit diagram of the switch circuit of FIG. 6.

Referring to Table 1, FIG. 6 and FIG. 7 at the same time. FIG. 6 shows a schematic diagram of a charge pump in an equalize stage. FIG. 7 shows an equivalent circuit diagram of the switch circuit of FIG. 6. The switches S3, S5 and S7 are turned on in a pump stage. The switches S1, S2, S4 and S6 are turned off in the pump stage. The output capacitor CT and the energy storage capacitor CR1 are connected in parallel. The flying capacitor CF and the energy storage capacitor CR2 are connected in parallel. The output capacitor CT adjusts the voltage VOUT+ of the positive voltage output terminal N3 to a half of the input voltage VDD, and the flying capacitor CF adjusts the voltage VOUT- of the negative voltage output terminal N4 to a half of the negative value of the input voltage VDD.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A charge pump, comprising:
    a voltage input terminal used for receiving an input voltage;
    a common terminal;
    a positive voltage output terminal;
    a negative voltage output terminal; and
    a switch circuit, comprising:
        a first switch used for coupling the voltage input terminal to one terminal of a flying capacitor;
        a second switch used for coupling the one terminal of the flying capacitor to one terminal of an output capacitor;
        a third switch used for coupling the one terminal of the flying capacitor to the common terminal;
        a fourth switch used for coupling another terminal of the flying capacitor to the one terminal of the output capacitor;
        a fifth switch used for coupling the one terminal of the output capacitor the positive voltage output terminal;
        a sixth switch used for coupling the other terminal of the flying capacitor to the common terminal; and
        a seventh switch used for coupling the other terminal of the flying capacitor to the negative voltage output terminal.

2. The charge pump according to claim 1, further comprising:
    a first energy storage capacitor, wherein one terminal of the first energy storage capacitor is coupled to the positive voltage output terminal, the other terminal of the first energy storage capacitor is coupled to the common terminal; and
    a second energy storage capacitor, wherein one terminal of the second energy storage capacitor is coupled to the negative voltage output terminal, and the other terminal of the second energy storage capacitor is coupled to the common terminal.

3. The charge pump according to claim 1, wherein the other terminal of the output capacitor is coupled to the common terminal.

4. The charge pump according to claim 1, wherein the first switch and the fourth switch are turned on in a charge stage, and the second switch, the third switch, the fifth switch, the sixth switch and the seventh switch are turned off in the charge stage.

5. The charge pump according to claim 4, wherein the second switch and the sixth switch are turned on in an equalize stage, and the first switch, the third switch, the fourth switch, the fifth switch and the seventh switch are turned off in the equalize stage.

6. The charge pump according to claim 5, wherein the third switch, the fifth switch and the seventh switch are turned on in a pump stage, and the first switch, the second switch, the fourth switch and the sixth switch are turned on in the pump stage.

7. The charge pump according to claim 6, further comprising:
    a switch controller used for controlling the first switch, the second switch, the third switch, the fourth switch, the fifth switch, the sixth switch and the seventh switch to sequentially enter the charge stage, the equalize stage and the pump stage.

8. The charge pump according to claim 6, wherein in the pump stage, the voltage of the positive voltage output terminal is equal to a half of the input voltage, and the voltage of the negative voltage output terminal is equal to a half of the negative value of the input voltage.

9. The charge pump according to claim 1, wherein the second switch and the sixth switch are turned on in an equalize stage, and the first switch, the third switch, the fourth switch, the fifth switch and the seventh switch are turned off in the equalize stage.

10. The charge pump according to claim 1, wherein the third switch, the fifth switch and the seventh switch are turned on in a pump stage, and the first switch, the second switch, the fourth switch and the sixth switch are turned on in the pump stage.

11. The charge pump according to claim 10, wherein in the pump stage, the voltage of the positive voltage output terminal is equal to a half of the input voltage, and the voltage of the negative voltage output terminal is equal to a half of the negative value of the input voltage.

12. The charge pump according to claim 1, further comprising:
    a switch controller used for controlling the first switch, the second switch, the third switch, the fourth switch, the fifth switch, the sixth switch and the seventh switch.

13. A switch circuit, comprising:
- a first switch used for coupling a voltage input terminal to one terminal of a flying capacitor, wherein the voltage input terminal receives an input voltage;
- a second switch used for coupling the one terminal of the flying capacitor to one terminal of an output capacitor;
- a third switch used for coupling the one terminal of the flying capacitor to a common terminal;
- a fourth switch used for coupling another terminal of the flying capacitor to the one terminal of the output capacitor;
- a fifth switch used for coupling the one terminal of the output capacitor to a positive voltage output terminal;
- a sixth switch used for coupling the other terminal of the flying capacitor to the common terminal; and
- a seventh switch used for coupling the other terminal of the flying capacitor to a negative voltage output terminal.

14. The switch circuit according to claim 13, wherein the first switch and the fourth switch are turned on in a charge stage, and the second switch, the third switch, the fifth switch, the sixth switch and the seventh switch are turned off in the charge stage.

15. The switch circuit according to claim 14, wherein the second switch and the sixth switch are turned on in an equalize stage, and the first switch, the third switch, the fourth switch, the fifth switch and the seventh switch are turned off in the equalize stage.

16. The switch circuit according to claim 15, wherein the third switch, the fifth switch and the seventh switch are turned on in a pump stage, and the first switch, the second switch, the fourth switch and the sixth switch are turned on in the pump stage.

17. The switch circuit according to claim 16, wherein in the pump stage, the voltage of the positive voltage output terminal is equal to a half of the input voltage, and the voltage of the negative voltage output terminal is equal to a half of the negative value of the input voltage.

18. The switch circuit according to claim 13, wherein the second switch and the sixth switch are turned on in an equalize stage, and the first switch, the third switch, the fourth switch, the fifth switch and the seventh switch are turned off in the equalize stage.

19. The switch circuit according to claim 13, wherein the third switch, the fifth switch and the seventh switch are turned on in a pump stage, and the first switch, the second switch, the fourth switch and the sixth switch are turned on in the pump stage.

20. The switch circuit according to claim 19, wherein in the pump stage, the voltage of the positive voltage output terminal is equal to a half of the input voltage, and the voltage of the negative voltage output terminal is equal to a half of the negative value of the input voltage.

* * * * *